US012735199B2

(12) United States Patent
Cuellar-Ferreira et al.

(10) Patent No.: US 12,735,199 B2
(45) Date of Patent: Sep. 15, 2026

(54) ELECTRICALLY CHARGED LUNAR REGOLITH COLLECTION DEVICES FOR LUNAR ROVERS

(71) Applicant: GM GLOBAL TECHNOLOGY OPERATIONS LLC, Detroit, MI (US)

(72) Inventors: Felipe Cuellar-Ferreira, Madison Heights, MI (US); Babak Makkinejad, Troy, MI (US); Maria Rossana Ruiz, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 783 days.

(21) Appl. No.: 18/106,775

(22) Filed: Feb. 7, 2023

(65) Prior Publication Data

US 2024/0262533 A1 Aug. 8, 2024

(51) Int. Cl.

*B64G 1/16* (2006.01)
*B25J 11/00* (2006.01)
*B25J 13/00* (2006.01)
*B25J 15/06* (2006.01)
*B25J 19/00* (2006.01)

(Continued)

(52) U.S. Cl.

CPC ............... *B64G 1/16* (2013.01); *B25J 11/005* (2013.01); *B25J 13/006* (2013.01); *B25J 15/0608* (2013.01); *B25J 19/0025* (2013.01); *B25J 19/027* (2013.01); *B64G 1/42* (2013.01)

(58) Field of Classification Search

CPC .. B64G 1/16; B64G 1/42; B25J 11/005; B25J 13/006; B25J 15/0608; B25J 19/0025; B25J 19/027; G01N 1/02

See application file for complete search history.

(56) References Cited

U.S. PATENT DOCUMENTS 3,601,448 A * 8/1971 Stone ..................... E01C 23/12 219/679

3,693,457 A * 9/1972 Pilat ................... G01N 15/0255 73/865.5

(Continued)

OTHER PUBLICATIONS

Fischer, H.R., "In-situ resource utilization-feasibility of the use of lunar soil to create structures on the moon via sintering based additive manufacturing technology". Aeronautics and Aerospace Open Acces Journal, vol. 2 (Issue 4), pp. 243-248, published 2018.

(Continued)

*Primary Examiner* — Timothy Wilhelm

(57) ABSTRACT

A lunar rover includes a body, at least one collection device configured to collect lunar regolith, and a power supply. In some examples, the collection device includes at least one wall defining an opening and at least one plate positioned in the opening. The power supply is configured to apply a voltage difference across the collection device. In some examples, the lunar rover further includes a movable arm including an end connected to the body and another end connected to the collection device, at least one polarity sensor configured to detect a polarity of lunar regolith adjacent to the lunar rover, and a controller configured to control the power supply to apply a voltage difference across the collection device based on the detected polarity of the lunar regolith adjacent to the lunar rover. Other examples of lunar rovers are also disclosed.

20 Claims, 9 Drawing Sheets

(51) Int. Cl.
*B25J 19/02* (2006.01)
*B64G 1/42* (2006.01)

(56) References Cited

U.S. PATENT DOCUMENTS

| | | | | |
|---|---|---|---|---|
| 3,795,135 | A * | 3/1974 | Andersen | G01N 1/2202 73/865.5 |
| 3,953,182 | A * | 4/1976 | Roth | G01N 1/2208 55/501 |
| 4,274,846 | A * | 6/1981 | Smith | B07B 9/02 55/319 |
| 4,762,009 | A * | 8/1988 | Scrudto | G01N 1/2035 73/863.52 |
| 5,412,975 | A * | 5/1995 | Raabe | B01D 45/04 73/28.04 |
| 5,536,286 | A * | 7/1996 | Freeman | B01D 50/20 55/525 |
| 6,105,695 | A * | 8/2000 | Bar-Cohen | B62D 57/024 180/8.5 |
| 7,723,654 | B2 * | 5/2010 | Taylor | B64G 99/00 219/679 |
| 8,159,357 | B1 * | 4/2012 | Jarvinen | G01V 9/02 340/580 |
| 8,578,788 | B2 * | 11/2013 | Ito | G01N 15/0606 73/861.42 |
| 8,850,904 | B2 * | 10/2014 | Ito | G01N 1/2208 73/863.52 |
| 9,193,402 | B2 * | 11/2015 | Chin | B08B 1/165 |
| 9,581,021 | B2 * | 2/2017 | Ethridge | H05B 6/702 |
| 10,307,970 | B2 * | 6/2019 | Snyder | B29C 64/321 |
| 10,919,805 | B2 * | 2/2021 | Qiao | B29C 70/60 |
| 11,091,929 | B2 * | 8/2021 | Taylor | E04B 1/92 |
| 11,143,026 | B2 * | 10/2021 | Sercel | E21C 51/00 |
| 11,383,436 | B2 * | 7/2022 | Ballard | B33Y 50/02 |
| 11,441,974 | B2 * | 9/2022 | Wang | G01N 1/02 |
| 11,479,373 | B2 * | 10/2022 | Chu | B64G 1/1071 |
| 11,719,100 | B2 * | 8/2023 | Metzger | B64G 5/00 209/39 |
| 11,725,513 | B2 * | 8/2023 | Sercel | H02J 50/30 166/302 |
| 11,852,016 | B2 * | 12/2023 | Kuhns | E21C 37/16 |
| 12,031,434 | B1 * | 7/2024 | Adams | B64G 1/105 |
| 12,071,851 | B2 * | 8/2024 | Metzger | B03C 1/02 |
| 12,091,973 | B1 * | 9/2024 | Salvino | B64G 1/16 |
| 12,100,580 | B1 * | 9/2024 | Salvino | H01J 49/0086 |
| 12,235,405 | B1 * | 2/2025 | Salvino | B64G 1/66 |
| 12,247,487 | B2 * | 3/2025 | Salvino | B64G 1/16 |
| 12,410,709 | B1 * | 9/2025 | Salvino | F24S 23/71 |
| 12,422,389 | B2 * | 9/2025 | Wen | G01P 15/003 |
| 12,434,251 | B1 * | 10/2025 | Salvino | B03C 3/41 |
| 2002/0134399 | A1 * | 9/2002 | Taylor | F24S 40/20 134/1 |
| 2008/0314166 | A1 * | 12/2008 | Settles | G01N 1/2226 73/864.35 |
| 2014/0345168 | A1 * | 11/2014 | Covey | E02F 7/10 37/195 |
| 2017/0341235 | A1 * | 11/2017 | Baloch | G05D 1/0248 |
| 2020/0240267 | A1 * | 7/2020 | Sercel | B64G 99/00 |
| 2022/0090500 | A1 * | 3/2022 | Sercel | E21C 51/00 |
| 2022/0290635 | A1 * | 9/2022 | Sercel | E21C 51/00 |
| 2022/0403740 | A1 * | 12/2022 | Kotenberg | E21B 41/00 |
| 2023/0249509 | A1 * | 8/2023 | Matthews | B60G 3/14 180/204 |
| 2024/0200447 | A1 * | 6/2024 | Lai | C01B 23/0042 |
| 2024/0227442 | A1 * | 7/2024 | Ruiz | B60B 35/004 |
| 2024/0247455 | A1 * | 7/2024 | Guru | G01N 21/21 |
| 2024/0351710 | A1 * | 10/2024 | Fu | B62D 57/028 |
| 2024/0388167 | A1 * | 11/2024 | Amenyo | H02K 7/1823 |
| 2025/0196200 | A1 * | 6/2025 | Quinlan | B64G 1/66 |
| 2025/0255448 | A1 * | 8/2025 | Yang | A47L 11/4036 |
| 2025/0297929 | A1 * | 9/2025 | Max | G01N 1/2294 |

OTHER PUBLICATIONS

U.S. Appl. No. 18/095,116, Ruiz et al.
U.S. Appl. No. 18/100,679, Guru et al.

* cited by examiner

ELECTRICALLY CHARGED LUNAR REGOLITH COLLECTION DEVICES FOR LUNAR ROVERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electrically charged lunar regolith collection devices for lunar rovers, and more particularly to collection devices having one or more plates therein and/or movable collection devices.

Lunar rovers are vehicles designed to move across the surface of the moon. When lunar rovers move on the surface of the moon, dust particles known as lunar regolith may be kicked up by the motion of the wheels of the rovers. Lunar regolith is typically sharp and jagged due to the moon having no natural weathering process for smoothing edges of the particles.

SUMMARY

An lunar rover includes a body, at least one collection device adjacent to the body and configured to collect lunar regolith, and a power supply. The at least one collection device includes at least one wall defining an opening and at least one plate positioned in the opening. The power supply is electrically connected to the at least one plate of the collection device and configured to apply a voltage difference across the at least one plate, thereby attracting lunar regolith into the at least one collection device.

In other features, the at least one collection device has a funnel shape with the opening tapering from a first end to a second end opposing the first end.

In other features, the at least one plate includes a steel wool mesh.

In other features, the at least one plate includes a first mesh plate having perforations and a second mesh plate having perforations, the first mesh plate and the second mesh plate are spaced apart from each other, and the perforations of the second mesh plate are smaller than the perforations of the first mesh plate.

In other features, the first mesh plate is adjacent to the first end of the opening in the collection device, and the second mesh plate is adjacent to the second end of the opening in the collection device.

In other features, the power supply is configured to apply a first voltage difference across the first mesh plate and a second voltage difference across the second mesh plate, and the second voltage difference is larger than the first voltage difference.

In other features, the at least one plate has a conical shape.

In other features, the at least one collection device includes a conduit extending through the at least one conical-shaped plate, and the conduit is configured to transport lunar regolith downward from the at least one conical-shaped plate to a bottom portion of the at least one collection device.

In other features, the lunar rover further includes at least one polarity sensor configured to detect a polarity of lunar regolith adjacent to the lunar rover.

In other features, the lunar rover further includes a controller in communication with the at least one polarity sensor. The controller is configured to control the power supply to adjust a polarity of the voltage difference applied across the at least one plate of the collection device based on the detected polarity of the lunar regolith adjacent to the lunar rover.

In other features, the lunar rover further includes a controller in communication with the at least one polarity sensor. The controller is configured to receive a signal from the at least one polarity sensor indicative of a charge of the lunar regolith adjacent to the lunar rover, determine a density of the lunar regolith adjacent the lunar rover based on the received signal, and control the power supply to adjust the voltage difference applied across the at least one plate of the collection device based on the determined density of the lunar regolith adjacent the lunar rover.

In other features, the lunar rover further includes at least one component sensitive to lunar regolith coupled to the body. The at least one collection device is coupled to the body adjacent to the at least one component.

An lunar rover includes a body, at least one collection device configured to collect lunar regolith, a movable arm including a first end connected to the body and a second opposing end connected to the at least one collection device, at least one polarity sensor configured to detect a polarity of lunar regolith adjacent to the lunar rover, a power supply electrically connected to the at least one collection device, and a controller in communication with the at least one polarity sensor and the power supply. The controller is configured to control the power supply to apply a voltage difference across the at least one collection device based on the detected polarity of the lunar regolith adjacent to the lunar rover, thereby attracting lunar regolith to the at least one collection device.

In other features, the controller is in communication with the movable arm. The controller is configured to receive a signal from the at least one polarity sensor, and in response to receiving the signal, adjust the movable arm from a first position to a second position.

In other features, the at least one collection device includes at least one wall defining an opening and at least one mesh plate positioned in the opening, and the controller is configured to control the power supply to apply the voltage difference across the at least one mesh plate, thereby attracting lunar regolith into the at least one collection device.

In other features, the at least one mesh plate includes a steel wool mesh.

In other features, the at least one mesh plate includes a first mesh plate having perforations and a second mesh plate having perforations, the perforations of the second mesh plate are smaller than the perforations of the first mesh plate, the controller is configured to control the power supply to apply a first voltage difference across the first mesh plate and a second voltage difference across the second mesh plate, and the second voltage difference is larger than the first voltage difference.

In other features, the at least one collection device includes at least one wall defining an opening and at least one conical-shaped plate positioned in the opening.

In other features, the at least one collection device includes a conduit extending through the at least one conical-shaped plate, and the conduit is configured to transport lunar regolith downward from the at least one conical-shaped plate to a bottom portion of the at least one collection device.

In other features, the at least one collection device includes a mesh plate at least partially surrounding a perimeter of the body.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

When a lunar rover operates on the surface of the moon, charged dust particles or charged lunar regolith are kicked up by the motion of the wheels of the rover and/or other disturbances caused by the rover. The charged dust particles may be attracted to and adhere to different components of the rover. Such components may include, for example, critical components sensitive to the particles such as electrical/electronic components (e.g., controllers, batteries, converters, etc.), mechanical components (e.g., radiators, chassis, axles, wheels, etc.), etc. Additionally, lunar regolith is abrasive due to its sharp and jagged edges. As such, lunar regolith kicked up by rover and/or other disturbances may cause undesirable wear and tear on such components.

Dust traps (also referred to as collection devices herein) according to the present disclosure include solutions to attract, collect and neutralize charged lunar regolith. For example, collection devices herein may be electrically charged with a voltage difference (e.g., a voltage potential) to attract lunar regolith. In various embodiments, the collection devices may include one or more electrified mesh plates (e.g., formed of perforated plates, steel wool plates, etc.), solid plates, etc. positioned within an interior space or opening of the devices. Additionally, in some embodiments, the collection devices may be coupled adjacent to and/or movable (e.g., via a movable arm, etc.) to a position adjacent to critical components of lunar rovers. As a result, the collection devices may attract, collect and neutralize at least a portion of the charged lunar regolith in the vicinity of the devices and the critical components, thereby preventing such lunar regolith from interacting with the components.

Figure 1:
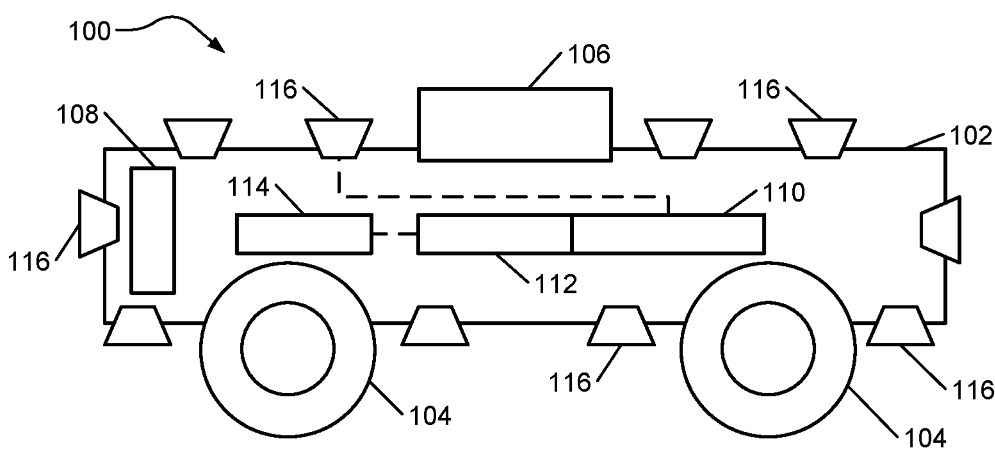
FIG. 1 is a functional block diagram of a lunar rover having multiple lunar regolith collection devices according to the present disclosure.

Referring now to FIG. 1, a lunar rover 100 having multiple lunar regolith collection devices coupled thereto is shown. As shown, the lunar rover 100 generally includes a body 102, wheels 104 (e.g., four wheels, etc.) coupled to the body 102, components 106, 108 coupled to the body 102 and susceptible to lunar regolith, a power supply 110, a controller 112 in communication with the power supply 110, a sensor 114 in communication with the controller 112, and multiple lunar regolith collection devices 116. The components 106, 108 may include, for example, various types of critical components such as electrical/electronic components (e.g., controllers, batteries, converters, etc.), mechanical components (e.g., radiators, chassis, axles, wheels, etc.), etc.

The power supply 110 applies a voltage difference across the collection devices 116 as further explained herein. For example, the power supply 110 (e.g., components therein) may be controlled by the controller 112 to apply the same or different voltage differences across the collection devices 116, and more specifically across components of the collection devices 116. In various embodiments, the power supply 110 may include, for example, one or more batteries, one or more voltage regulators, etc.

The sensor 114 detects various parameters of lunar regolith in the area of the lunar rover 100 and/or parameters of components of the lunar rover 100. For example, the sensor 114 may be a polarity sensor for detecting a polarity of lunar regolith adjacent to the lunar rover 100. In other examples, the sensor 114 may be a temperature sensor for monitoring temperature of components (e.g., the batteries, etc.) of the lunar rover 100, and/or for monitoring ambient temperature near the lunar rover 100. Although the rover 100 of FIG. 1 is shown as including one, centrally located sensor 114, it should be appreciated that the rover 100 may include multiple sensors (e.g., polarity sensors, temperature sensors, etc.) positioned near the collection devices 116, components of the rover 100, etc.

The collection devices 116 of FIG. 1 may be positioned on or near the body 102 and adjacent to the components 106, 108 and/or other sensitive/critical components of the rover 100. For example, one or more of the collection devices 116 may be coupled to the body 102 near the component 106, the component 108 (e.g., a radiator of the rover 100), the power supply 110, the controller 112, etc. In some examples, the collection devices 116 may be fixed in a position (e.g., embedded in the body 102) or movable. For instance, one or more of the collection devices 116 may be detachably coupled (e.g., via one or more mechanical devices) to the body 102, thereby allowing the collection devices 116 to move from one position to another position if desired. Although the rover 100 of FIG. 1 is shown as including ten collection devices 116 positioned on the body 102, it should be appreciated that the rover 100 may include more or less collection devices positioned at different locations on or near the body 102 if desired.

The collection devices 116 may be any suitable devices for collecting lunar regolith. For example, each of the collection devices 116 includes at least one component (e.g., a wall, a plate, etc.) that is at least partially formed of electrically conductive material. For example, and as further explained herein, any one of the collection devices 116 may include one or more perforated plates, steel wool plates, solid plates, etc. that are electrified to attract charged lunar regolith. In various embodiments, each of the collection devices 116 of FIG. 1 may have the same configuration. In other examples, some of the collection devices 116 may have a different configuration.

Figure 2:
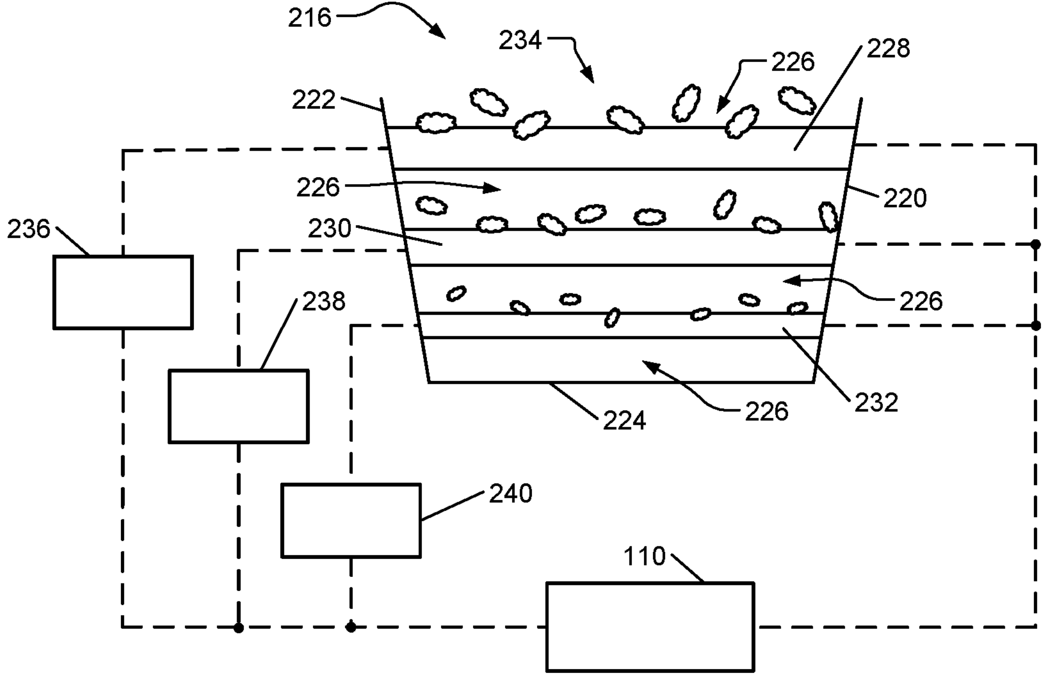
FIG. 2 is a functional block diagram of an exemplary lunar regolith collection device employable in the lunar rover of FIG. 1 according to the present disclosure.

For example, FIG. 2 illustrates an example collection device 216 employable as any one of the collection devices 116 of FIG. 1. As shown, the collection device 216 generally includes walls 220, 222, 224 defining an opening 226, and three mesh plates 228, 230, 232 coupled between the walls 220, 222. Although not shown in FIG. 2, the collection device 216 includes other walls (e.g., front and back side walls) coupled between the walls 220, 222 (e.g., side walls) and the wall 224 (e.g., a bottom wall) to form a substantially enclosed device having an inlet 234 for allowing lunar regolith to enter. In various embodiments, the side walls and/or the bottom wall may be one continuous piece of material or multiple pieces of material coupled together.

In the embodiment of FIG. 2, the side walls 220, 222 are angled inward toward each other. With this configuration, the collection device 216 has a funnel shape with the opening 226 tapering from one end (near top portions of the side walls 220, 222) to another, opposing end (near the bottom portions of the side walls 220, 222), as shown in FIG. 2.

The mesh plates 228, 230, 232 are spaced apart from each other and positioned in the opening 226. More specifically, the mesh plate 228 is positioned adjacent one end (e.g., near the top portions of the side walls 220, 222) of the opening 226, the mesh plate 232 is positioned adjacent another end (e.g., near the bottom portions of the side walls 220, 222) of the opening 226, and the mesh plate 230 is positioned between the mesh plates 228, 232.

As shown in FIG. 2, the mesh plates 228, 230, 232 have different thicknesses relative to each other. For example, the mesh plate 228 has a greater width than the mesh plates 230, 232. Additionally, the mesh plate 230 has a greater width than the mesh plate 232. In such examples, each mesh plate 228, 230, 232 may have a different charge density due to (in part) the differing thicknesses.

Although the collection device 216 is shown as including three, particularly arranged mesh plates 228, 230, 232 having different thicknesses, it should be appreciated that in other embodiments the collection device 216 (and/or any other collection device herein) may include more or less mesh plates having the same or different thicknesses. For example, the collection device 216 may include one mesh plate, two mesh plates, five mesh plates, etc. of the same or different thicknesses. In some embodiments, the collection device 216 (and/or any other collection devices herein) may include only non-mesh plates (e.g., solid plates, etc.), and/or a mixture of both non-mesh plates and mesh plates.

Additionally, each mesh plate 228, 230, 232 includes perforations. For example, each plate may have a random distribution of perforations, or a uniform distribution of perforations (or a mix of both). For instance, the uniform distribution may include perforations arranged in lines, perforations arranged in equally spaced patterns, etc. Additionally, the perforations may have an irregular shape or a regular shape (or a mix of both). For example, the perforations may be circular, square, hexagonal, triangular, etc. In some example embodiments, the perforations may have a circular shape, and a diameter in a range of about 1 μm to about 100 μm. The range may scale with dimensions of the rover 100 of FIG. 1 and/or components therein.

Figure 3:
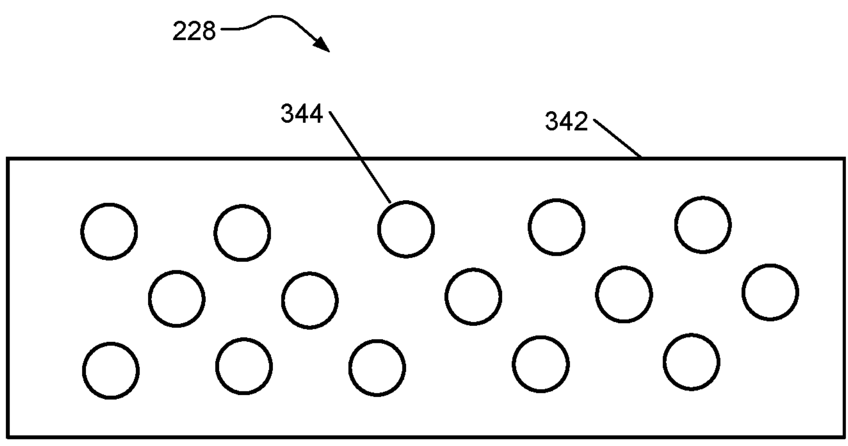
FIGS. 3-6 are functional block diagrams of exemplary mesh plates employable in the lunar regolith collection device of FIG. 2 according to the present disclosure.
Figure 4:
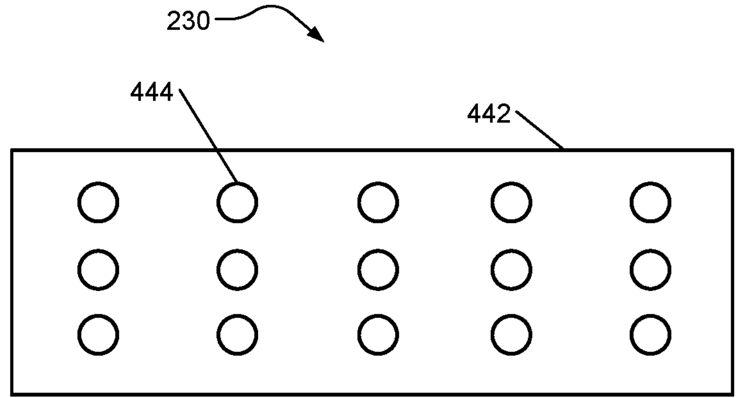
Figure 5:
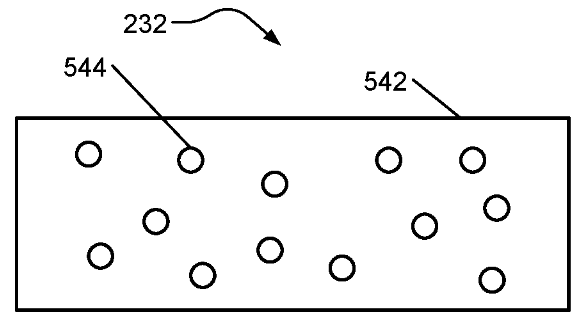

FIGS. 3-5 illustrate examples of the mesh plates 228, 230, 232 of FIG. 2. Each mesh plate 228, 230, 232 includes a base 342, 442, 542 defining circular perforations 344, 444, 544, respectively. As shown, the perforations 344 of the plate 228 are arranged in offset lines and have a uniform distribution, the perforations 444 of the plate 230 are arranged in symmetrical lines and have a uniform distribution, and the perforations 544 of the plate 232 have a random distribution.

In the example of FIGS. 3-5, the perforations 344, 444, 544 of the plates 228, 230, 232 have different sizes. For example, the perforations 544 of the mesh plate 232 are smaller (e.g., in diameter) than the perforations 344, 444 of the mesh plates 228, 230, and the perforations 444 of the mesh plate 230 are smaller (e.g., in diameter) than the perforations 344 of the mesh plate 228. As one example, the perforations 544 may have a diameter of about 1 μm, the perforations 444 may have a diameter of about 10 μm, and the perforations 344 may have a diameter of about 100 μm. In such examples, particles of lunar regolith smaller than about 100 μm may pass through the mesh plate 228 (via the perforations 344), particles of lunar regolith smaller than about 10 μm may pass through the mesh plate 230 (via the perforations 444), and particles of lunar regolith smaller than about 1 μm may pass through the mesh plate 232 (via the perforations 544). As such, smaller particles of lunar regolith collected in the collection device 216 are allowed to fall deeper into the collection device 216 while the larger particles of lunar regolith are filtered and collected at the appropriate mesh plate 228, 230, 232.

Figure 6:
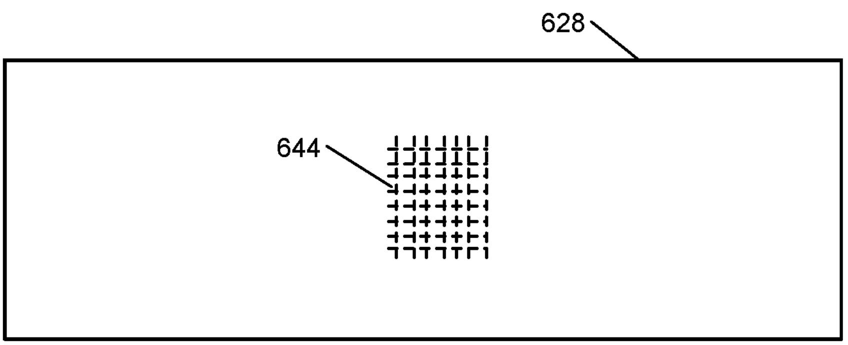

Although the plates 228, 230, 232 of FIGS. 3-5 are shown with a particular number of the perforations 344, 444, 544 arranged in a particular manner, it should be appreciated that in other embodiments the plates 228, 230, 232 may include a different number of perforations, different sized and/or shaped perforations, a different distribution, etc. For example, FIG. 6 illustrates another example mesh plate 628 that is employable as any one of the mesh plates 228, 230, 232 of FIG. 2. As shown, the mesh plate 628 includes a collection of thin wires 644 (only a portion of which is shown in FIG. 6 for clarity) crossing each other to form a mesh configuration.

Figure 7:
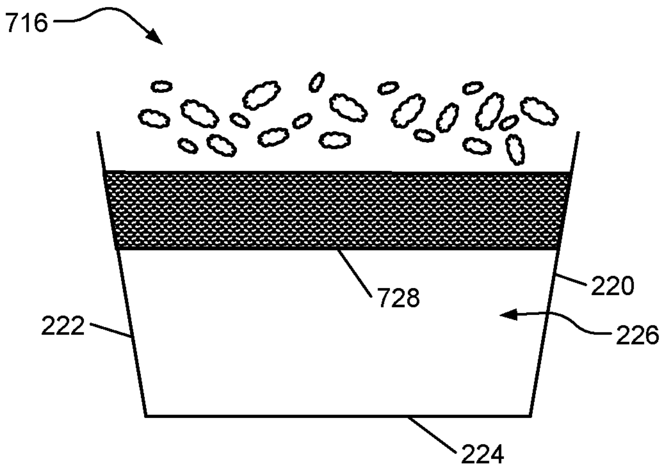
FIG. 7 is a functional block diagram of another exemplary lunar regolith collection device including an electrically conductive mesh according to the present disclosure.

In other embodiments, the mesh plates disclosed herein may include a steel wool mesh or another suitable electrically conductive mesh material. For example, FIG. 7 another example collection device 716 employable as any one of the collection devices 116 of FIG. 1. The collection device 716 of FIG. 7 is substantially similar to the collection device 216 of FIG. 2 but includes a steel wool mesh. Specifically, and as shown in FIG. 7, the collection device 716 generally includes the walls 220, 222, 224 and the opening 226 of FIG. 2, and a steel wool mesh plate 728 coupled between the walls 220, 222. Although the collection device 716 of FIG. 7 is shown as only including one layer of the steel wool mesh, it should be appreciated that additional layers of steel wool mesh and/or another electrically conductive material may be employed in some embodiments. For example, the collection device 716 may include three layers of steel wool mesh spaced apart from each other in a similar manner as the mesh plate 228, 230, 232 of FIG. 2.

The steel wool mesh plate 728 includes a collection of thin wires randomly positioned across the collection device 716. The thin wires define randomly distributed perforations of different sizes and shapes to collect lunar regolith of different sizes and shapes.

Referring back to FIG. 1, the power supply 110 may be electrically connected to any one of the plates, mesh, etc. disclosed herein (e.g., the mesh plates 228, 230, 232, 628 of FIGS. 2-6, the mesh plate 728 of FIG. 7, etc.) and apply a voltage difference across such plates, mesh, etc. For example, and with reference to FIG. 2, the power supply 110 of FIG. 1 is electrically connected to each mesh plate 228, 230, 232 and applies a voltage difference across each mesh plate 228, 230, 232. More specifically, the power supply 110 of FIG. 2 is electrically connected to the mesh plates 228, 230, 232 via voltage regulators 236, 238, 240, respectively. The voltage regulators 236, 238, 240 may be external to and electrically connected to the power supply 110 (as shown in FIG. 2) or components of the power supply 110 (and internal to the power supply 110). In either case, each voltage regulator 236, 238, 240 may be individually controlled by the controller 112 (of FIG. 1) to provide a desired voltage across its associated plate 228, 230, 232.

The power supply 110 may apply the same voltage difference across each mesh plate 228, 230, 232 or different voltage differences across one or more of the mesh plates 228, 230, 232. For example, in some embodiments, the power supply 110 may apply one voltage difference across the mesh plate 228 (via the regulator 236), another voltage difference across the mesh plate 230 (via the regulator 238), and yet another voltage difference across the mesh plate 232 (via the regulator 240). In some examples, the voltage difference across the mesh plate 232 (the thinnest plate) may be larger than the voltage differences across the mesh plates 228, 230, and the voltage difference across the mesh plate 230 may be larger than the voltage difference across the mesh plate 228. As such, in this example, the mesh plate 232 (which is positioned deepest into the opening 226 of the collection device 216) has the largest applied voltage difference and charge density (relative to the other plates 228, 230) to attract lunar regolith collected in the collection device 216. As a result, lunar regolith collected in the collection device 216 is drawn further into the collection device 216 and inhibited from escaping the collection device 216.

In various embodiments, the power supply 110 (and/or the voltage regulator 236, 238, 240) may be controlled to selectively apply, adjust, etc. a polarity of the voltage difference across any one of the collection devices, plates, mesh, etc. disclosed herein. For example, and with reference to FIGS. 1-2, the controller 112 may receive a signal from the sensor 114 (e.g., a polarity sensor) indicating the polarity of the lunar regolith adjacent the lunar rover 100. Then, the controller 112 may control the power supply 110 (and/or the voltage regulator 236, 238, 240) to selectively apply, adjust, etc. a polarity of the voltage differences applied across the mesh plates 228, 230, 232 based on the detected polarity of the lunar regolith adjacent to the lunar rover 100. In such examples, the mesh plates 228, 230, 232 may have an opposite charge to the prevailing charge of the lunar regolith. As the dust particles attach to the mesh plates 228, 230, 232, the charge of the dust particles is neutralized by the plates 228, 230, 232, and the dust particles may then fall against the plates and/or fall further into the collection device 216.

Additionally, the power supply 110 (and/or the voltage regulator 236, 238, 240) may be controlled to selectively apply, adjust, etc. a voltage difference across any one of the collection devices, plates, mesh, etc. disclosed herein. For example, and with continued reference to FIGS. 1-2, the controller 112 may receive a signal from the sensor 114 (e.g., a polarity sensor) indicating the charge of the lunar regolith adjacent to the lunar rover 100. The controller 112 may then determine a density of the lunar regolith adjacent to the lunar rover 100 based on the received signal. For example, the controller 112 may estimate the density (e.g., parts per million, etc.) of dust particles adjacent to the lunar rover 100 based (in part) on the collective charge of the lunar regolith, a known amount of charge of a typical dust particle, and a known detection area (e.g., a volume) of the sensor 114.

Then, the controller 112 may control the power supply 110 (and/or the voltage regulator 236, 238, 240) to selectively apply, adjust, etc. a voltage difference across the mesh plates 228, 230, 232 of FIG. 2 based on the determined density of the lunar regolith adjacent the lunar rover 100. For example, if the determined density is above a defined threshold, the controller 112 may control the power supply 110 to apply a defined voltage difference across one or more of the mesh plates 228, 230, 232, to increase the voltage difference across one or more the mesh plates 228, 230, 232, etc. In other examples, if the determined density is below the defined threshold (or another defined threshold), the controller 112 may control the power supply 110 to apply another defined voltage difference across one or more the mesh plates 228, 230, 232, to decrease, remove, etc. the voltage difference across one or more the mesh plates 228, 230, 232, etc. In this way, time-variable voltage differences may be applied, adjusted, etc. across the mesh plates 228, 230, 232, to control a speed, direction, etc. of a flow of the lunar dust particles, and therefore control where the lunar regolith is accumulated on the lunar rover 100.

Although the features of the power supply 110 and the controller 112 are described above with reference to the collection device 216 and the mesh plates 228, 230, 232, it should be appreciated that the same features may be applied to other collection devices and/or plates disclosed herein, including the mesh plate 628 of FIG. 6, the collection device 716 and the steel wool mesh plate 728 of FIG. 7, etc.

In various embodiments, the collection devices disclosed herein may be configured and/or include one or more components to effectively dispose of the collected lunar regolith. For example, any one of the collection devices may include one or more plates having a shape for encouraging collected lunar regolith to fall towards a bottom portion of the collection device, to collect in designated areas along the plate(s) of the collection device, etc.

Figure 8:
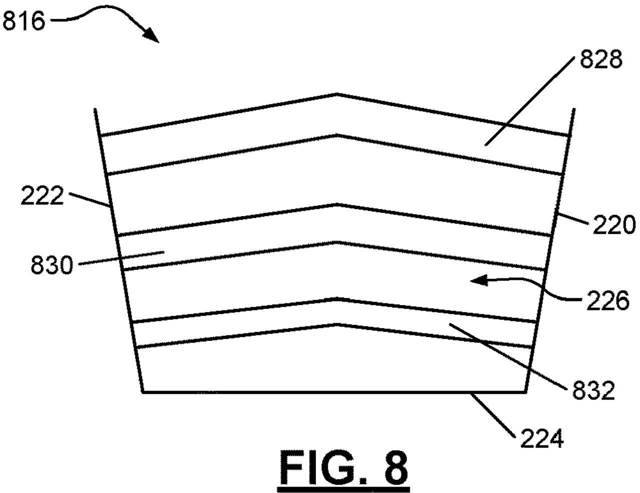
FIG. 8 is a functional block diagram of another exemplary lunar regolith collection device including electrically conductive, conical-shaped plates according to the present disclosure.

FIG. 8 illustrates one example collection device 816 employable as any one of the collection devices 116 of FIG. 1. The collection device 816 of FIG. 8 is substantially similar to the collection device 216 of FIG. 2 but includes conical-shaped plates. Specifically, and as shown in FIG. 8, the collection device 816 generally includes the walls 220, 222, 224 and the opening 226 of FIG. 2, and three conical-shaped plates 828, 830, 832 coupled between the walls 220, 222. The example of FIG. 8, the conical-shaped plates 828, 830, 832 may include solid plates, mesh plates (e.g., similar to the mesh plates 228, 230, 232, 628 of FIGS. 2-6), steel wool mesh, etc. Additionally, the conical-shaped plates 828, 830, 832 may be electrified to have a voltage difference as explained herein.

As shown in FIG. 8, each conical-shaped plate 828, 830, 832 includes an apex (or vertex) positioned near a middle portion between the side walls 220, 222 and sides extending downward from the apex towards the side walls 220, 222. In this manner, lunar regolith may contact the conical-shaped plates 828, 830, 832 thereby neutralizing the charge of the lunar regolith particles. The particles may then fall along the plates 828, 830, 832 towards the side walls 220, 222 and collect in crevices defined by the plates 828, 830, 832 and the side walls 220, 222. The collected lunar regolith particles may then be disposed of at a later time by turning the collection device 816 to allow the neutralized lunar regolith particles to fall out of the collection device 816.

In various embodiments, the plates 828, 830, 832 may define one or more openings near the side walls 220, 222. With this arrangement, collected and neutralized lunar regolith particles may fall downward through the openings and to a bottom portion of the collection device 816 for disposal at a later time (as explained above).

Figure 9:
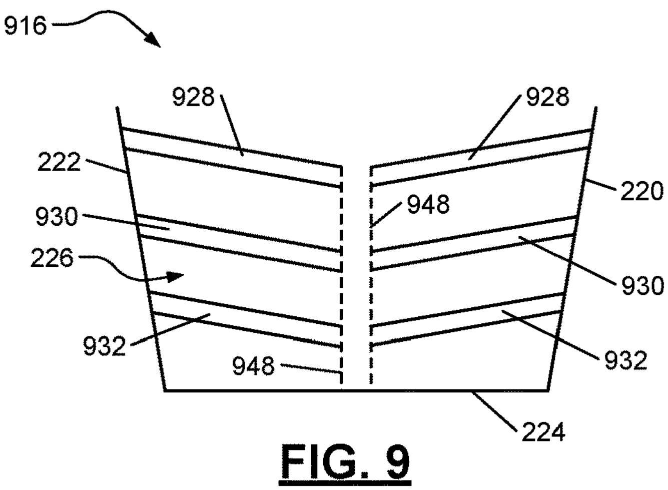
FIG. 9 is a functional block diagram of another exemplary lunar regolith collection device including electrically conductive, conical-shaped plates and a conduit extending through the plates according to the present disclosure.

FIG. 9 illustrates another example collection device 916 employable as any one of the collection devices 116 of FIG. 1. The collection device 916 of FIG. 9 is substantially similar to the collection device 816 of FIG. 8 but includes different configured conical-shaped plates. Specifically, and as shown in FIG. 9, the collection device 916 generally includes the walls 220, 222, 224 and the opening 226 of FIG. 2, three conical-shaped plates 928, 930, 932 coupled between the walls 220, 222, and a conduit 948 extending through the plates 928, 930, 932. In the example of FIG. 9, the conical-shaped plates 928, 930, 932 may include solid plates, mesh plates (e.g., similar to the mesh plates 228, 230, 232, 628 of FIGS. 2-6), steel wool mesh, etc. Additionally, the conical-shaped plates 928, 930, 932 may be electrified to have a voltage difference as explained herein.

As shown in FIG. 9, each conical-shaped plate 928, 930, 932 includes an apex (or vertex) positioned near a middle portion between the side walls 220, 222 and sides extending upward from the apex towards the side walls 220, 222. In this manner, lunar regolith may contact the conical-shaped plates 928, 930, 932 thereby neutralizing the charge of the lunar regolith particles. The particles may then fall downward along the plates 928, 930, 932 towards the apex, and into the conduit 948. The conduit 948 may then transport the collected particles downward from the plates 928, 930, 932 to a bottom portion of the collection device 916. At this point, the particles may collect in the bottom portion of the collection device 916 for disposal at a later time (as explained above). In some embodiments, the bottom wall 224 may include a door that opens via user control and/or via a controller to allow the collected particles to fall out of the collection device 916.

In various embodiments, the lunar rovers disclosed herein may include one or more movable arms (e.g., movable levers, etc.) for moving lunar regolith collection devices of the rovers from one position to another position.

Figure 10:
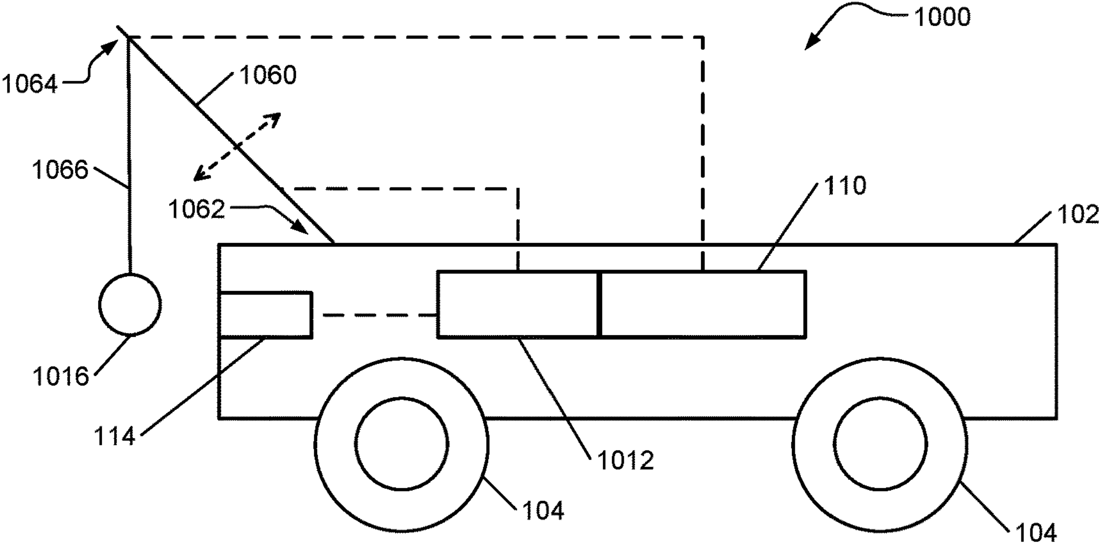
FIG. 10 is a functional block diagram of a lunar rover having a movable arm and a lunar regolith collection device connected to the movable arm according to the present disclosure.

For example, FIG. 10 illustrates a lunar rover 1000 substantially similar to the lunar rover 100 of FIG. 1 but includes a movable arm for moving a lunar regolith collection device. Specifically, the lunar rover 1000 generally includes the body 102, the wheels 104, the power supply 110, and the sensor 114 (e.g., a polarity sensor) of FIG. 1. As shown, the rover 1000 further includes a movable arm 1060, a lunar regolith collection device 1016 electrically connected to the power supply 110, and a controller 1012 in communication with the power supply 110, the sensor 114, and the movable arm 1060. While not shown in FIG. 10, the rover 1000 may also include one or more sensitive/critical components as explained herein.

The collection device 1016 may be any one of the collection devices disclosed herein, such any one of the collection devices 116, 216, 716, 816, 916 of FIGS. 1-2 and 7-9). In some embodiments, the collection device 1016 may include at least one solid or mesh component (e.g., a wall, a plate, a mesh, etc.) that is at least partially formed of electrically conductive material.

As shown in FIG. 10, the movable arm 1060 is connected between the body 102 and the collection device 1016. For example, the movable arm 1060 includes an end 1062 connected to the body 102 and another opposing end 1064 connected to the collection device 1016 via a connector 1066. In such examples, the connector 1066 may be one or more electrically conductive wires and/or any other suitable device to support the collection device 1016 and relay power from the power supply 110 (via an optional voltage regulator) to the collection device 1016. The movable arm 1060 may be any suitable material for supporting the collection device 1016, such as metal (e.g., aluminum, steel, etc.), plastic, a combination of metal and plastic, etc.

In various embodiments, the movable arm 1060 may be controlled to move the collection device 1016 from one position to another position. For example, the controller 1012 may control movement of the arm 1060 to raise and lower the collection device 1016 connected thereto. In such examples, the controller 1012 may control an actuator, a motor, etc. to move the arm 1060.

For instance, the controller 1012 may receive a signal from the sensor 114 indicating an amount of lunar regolith adjacent to the lunar rover 1000. In such examples, the signal from the sensor 114 may be indicative of a polarity of charged dust particles adjacent to the lunar rover 1000 and thereby indicating a presence of lunar regolith. In other examples, the signal from the sensor 114 may be used by the controller 1012 to estimate a density (e.g., parts per million, etc.) of dust particles adjacent to the lunar rover 1000 as explained herein.

Then, the controller 1012 may adjust the movable arm 1060 based on the received signal from the sensor 114. For example, the controller 1012 may receive a signal from the sensor 114 indicating a large presence of lunar regolith adjacent to the lunar rover 1000, and lower the movable arm 1060 from a high position to a low position in response to the received signal. In such examples, the controller 1012 may lower the movable arm 1060 if the amount of lunar regolith or the time duration of detected lunar regolith is greater than a defined threshold. Additionally, the controller 1012 may receive another signal from the sensor 114 indicating the absence of or a small amount of lunar regolith adjacent to the lunar rover 1000, and raise the movable arm 1060 from the low position to the high position in response to the received signal. In such examples, the controller 1012 may raise the movable arm 1060 if the presence of lunar regolith or the time duration of detected lunar regolith is below the defined threshold (or another defined threshold).

Although the lunar rover 1000 of FIG. 10 is shown as having one movable arm 1060 and one collection device 1016, it should be appreciated that the lunar rover 1000 may include more than one movable arm and/or collection device in other embodiments. For example, the rover 1000 may include multiple collection devices connected to the movable arm 1060, multiple movable arms each having at least one collection device connected thereto, etc. In such examples, each collection device and/or movable arm may be individually or collectively controlled by the controller 1012 as explained herein.

Additionally, the controller 1012 may control the power supply 110 in a similar manner as explained above relative to FIGS. 1-2. For example, the controller 1012 may control the power supply 110 (and/or the voltage regulator) to selectively apply, adjust, etc. a voltage difference across the collection device 1016 and/or components (e.g., a mesh plate, a steel wool mesh, etc.) of the collection device 1016. Such control may be based on, for example, a detected polarity of lunar regolith adjacent to the lunar rover 1000, a determined density of lunar regolith adjacent to the lunar rover 1000, etc.

Figure 11:
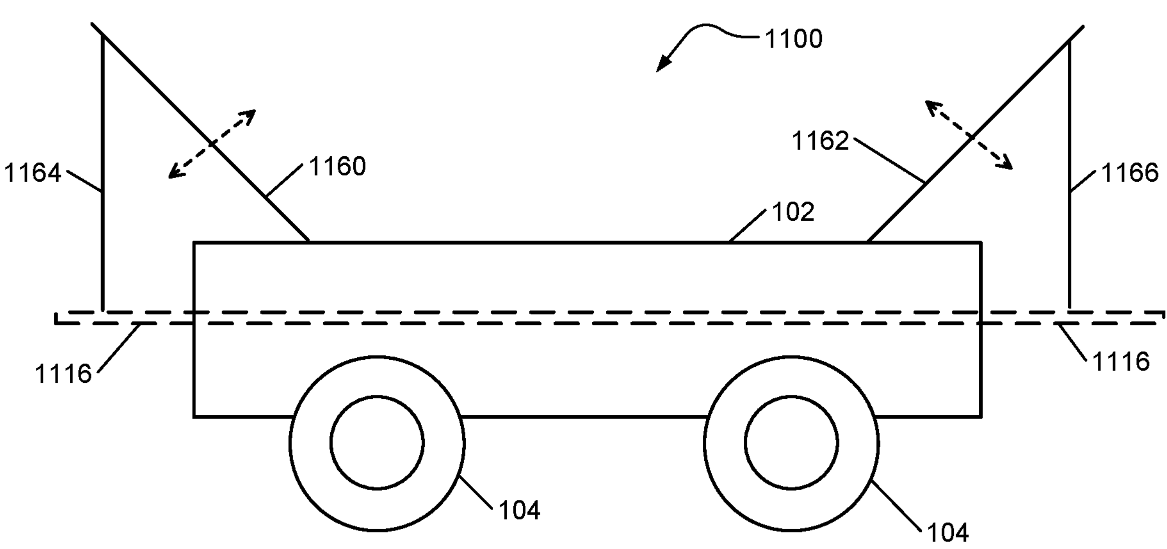
FIG. 11 is a functional block diagram of a lunar rover having movable arms and an electrically conductive, mesh skirt connected to the movable arms according to the present disclosure.
Figure 12:
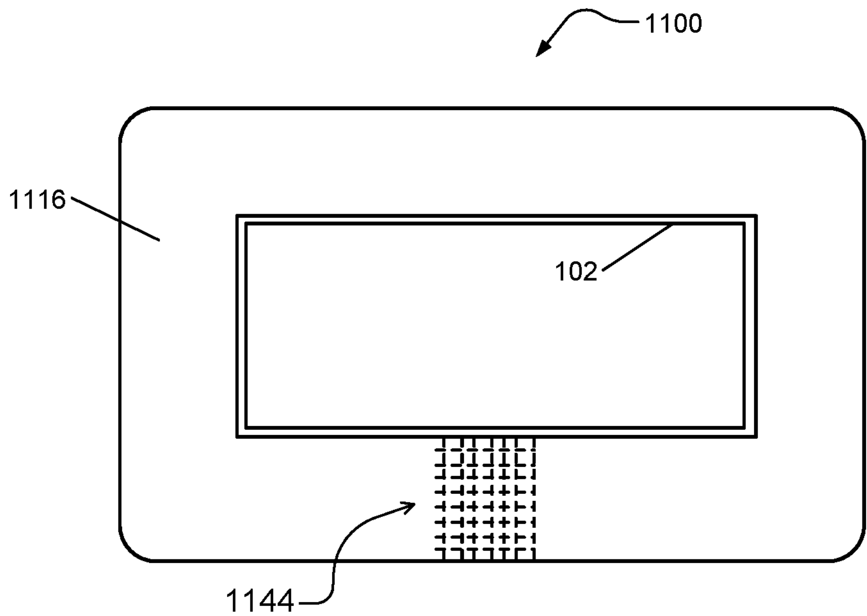
FIG. 12 is a top view of the lunar rover of FIG. 11 according to the present disclosure.

FIGS. 11-12 illustrates another example lunar rover 1100 having movable arms for moving lunar regolith collection devices. The lunar rover 1100 of FIGS. 11-12 is substantially similar to the lunar rover 1000 of FIG. 10 but includes multiple movable arms and a collection device in the form of a mesh plate. More specifically, the lunar rover 1100 generally includes the body 102, the wheels 104, movable arms 1160, 1166, and a mesh plate (e.g., a skirt) 1116. While not shown in FIGS. 11-12, the rover 1100 may also include a power supply, a controller, one or more sensors, and one or more sensitive/critical components as explained above relative to FIGS. 1 and 10.

As shown, the mesh plate 1116 is positioned about a perimeter of the rover 1100. More specifically, the mesh plate 1116 surrounds a perimeter of the body 102 as shown best in FIG. 12. In the example of FIGS. 11-12, the mesh plate 1116 entirely surrounds the perimeter of the body 102. In other embodiments, the mesh plate 1116 may partially extend about the perimeter of the body 102 such that the mesh plate 1116 only partially surrounds the perimeter of the body 102. In either case, the mesh plate 1116 may serve as protection of the rover 1100 by attracting collecting and neutralizing charged dust particles disturbed by movement of the wheels 104.

The mesh plate 1116 of FIGS. 11-12 is at least partially formed of electrically conductive material. For example, in FIGS. 11-12, the mesh plate 1116 includes a collection of thin wires 1144 (only a portion of which is shown in FIG. 12 for clarity) crossing each other to form a mesh configuration. In other examples, the mesh plate 1116 may include an electrically conductive base defining perforations as explained herein. In still other examples, the rover 1100 may include a solid, electrically conductive plate instead of or in addition to the mesh plate 1116.

As shown in FIGS. 11-12, the movable arms 1160, 1166 are connected between the body 102 and the mesh plate 1116. For example, each movable arm 1160, 1166 includes an end connected to the body 102 and another opposing end connected to the mesh plate 1116 via connectors 1164, 1166. In such examples, the connectors 1164, 1166 may be one or more electrically conductive wires and/or any other suitable device to support the mesh plate 1116 and relay power from the power supply to the mesh plate 1116. The movable arms 1160, 1166 may be any suitable material for supporting the mesh plate 1116, such as metal (e.g., aluminum, steel, etc.), plastic, a combination of metal and plastic, etc.

The movable arms 1160, 1166 may be controlled to move the mesh plate 1116 in a similar manner as explained above relative to the movable arm 1060 of FIG. 10. For example, the controller may receive a signal from the sensor indicating an amount of lunar regolith adjacent to the lunar rover 1100, and then control movement of the arms 1160, 1166 to raise and lower the mesh plate 1116 connected thereto, as explained above.

Additionally, the mesh plate 1116 may be electrified via the power supply in a similar manner as explained above. For example, the controller may control the power supply (and/or the voltage regulator) to selectively apply, adjust, etc. a voltage difference across the mesh plate 1116. Such control may be based on, for example, a detected polarity of lunar regolith adjacent to the lunar rover 1100, a determined density of lunar regolith adjacent to the lunar rover 1100, etc.

Figure 13:
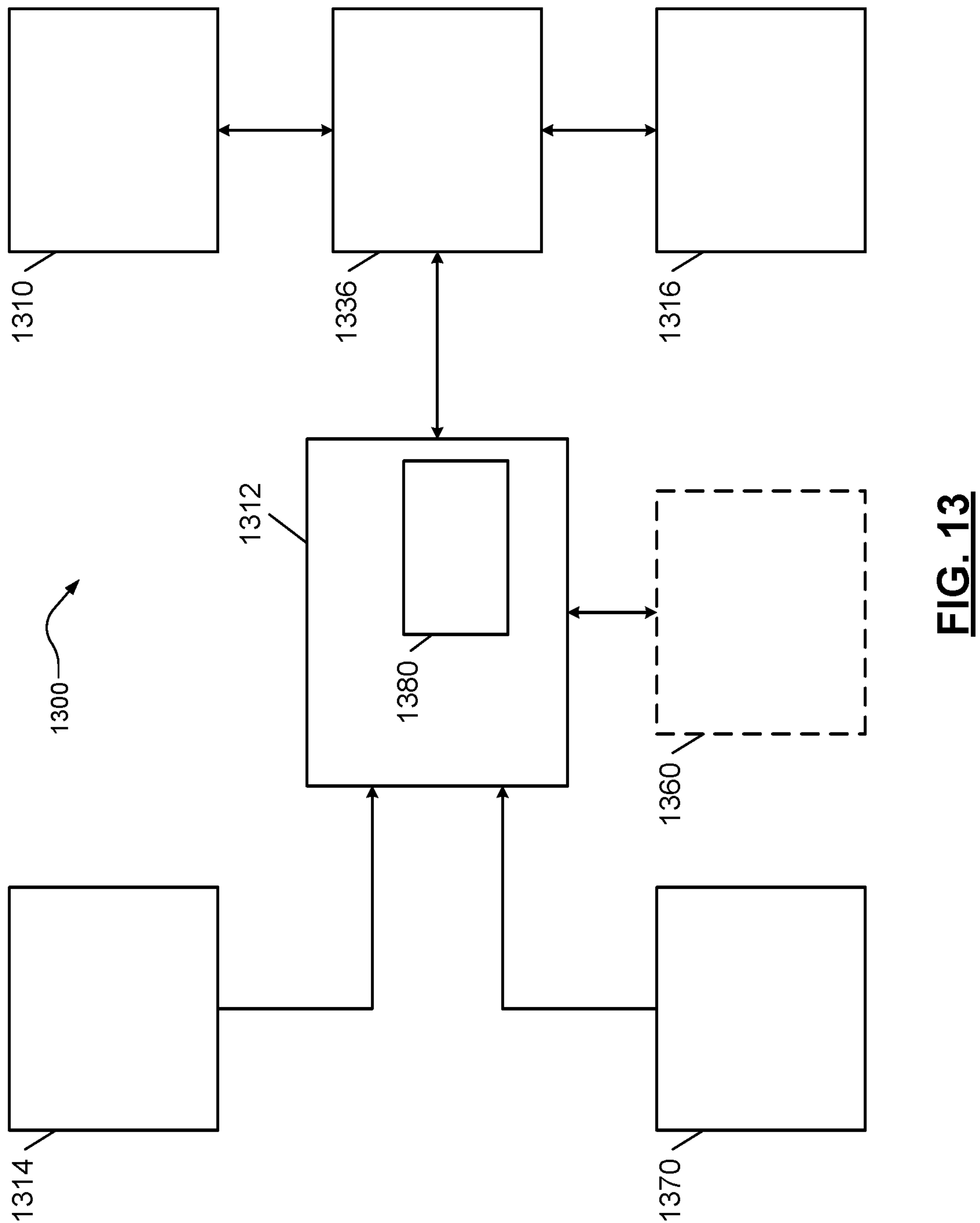
FIG. 13 is a block diagram of a power system of a lunar rover according to the present disclosure.

FIG. 13 is a block diagram of power system components of any one of the lunar rovers disclosed herein. As shown in FIG. 13, a power system 1300 includes a power supply 1310 and a controller 1312. The power supply 1310 provides power to the controller 1312 for operation of the controller 1312, and may selectively provide power to one or more collection devices 1316 via one or more voltage regulators 1336. For example, the controller 1312 may receive a signal from one or more polarity sensors 1314 indicative of a polarity and/or density of lunar regolith adjacent a lunar rover, and then control each voltage regulator 1336 to apply a specified voltage difference to its associated collection device 1316 and/or components thereof. Additionally, the controller 1312 may control one or more (optional) movable arms 1360 to move the collection device(s) 1316 as desired based on the received signal.

FIG. 13 also illustrates one or more temperature sensors 1370. The temperature sensor(s) 1370 may be used for monitoring temperature of components of the lunar rover, such as batteries, etc. Although FIG. 13 illustrates one example embodiment of components of the power system 1300, other embodiments may include more or less components, components in different connection arrangements, etc.

As shown in FIG. 13, the controller 1312 includes computer-executable instructions 1380. The computer-executable instructions 1380 may be stored in memory associated with the controller 1312, stored in other memory that is accessed by the controller 1312 to execute the computer-executable instructions 1380, etc. For example, the computer-executable instructions 1380 may include instructions for controlling voltages applied to the collection device(s) 1316 and/or components thereof, controlling movement of the arm(s) 1360, etc. Example processes for controlling applied voltages and movement of the arm(s) 1360, which may be stored in the computer-executable instructions 1380, are described further below with reference to FIGS. 14-16.

Figure 14:
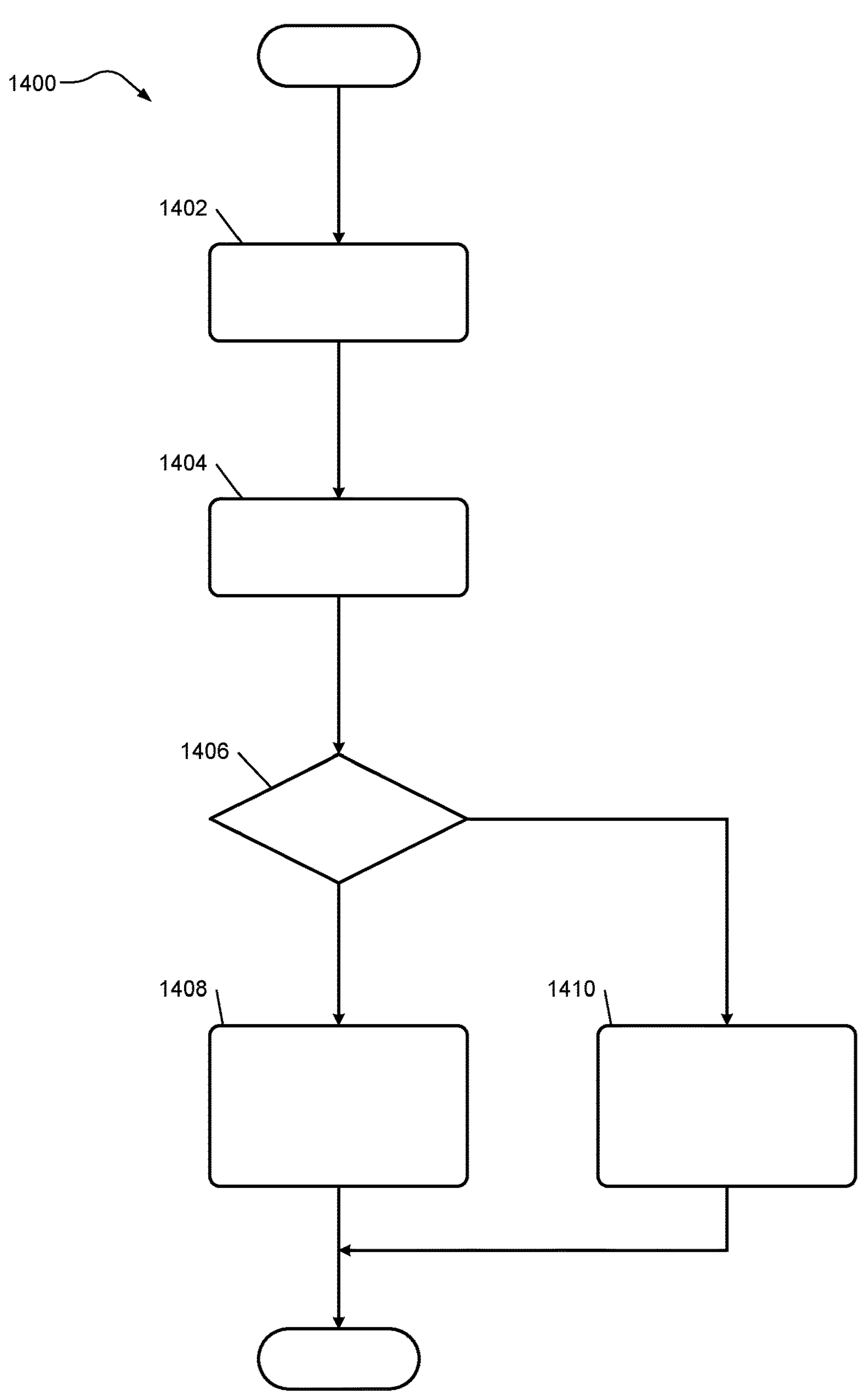
FIG. 14 is a flowchart of a control process for controlling a voltage difference applied across a lunar regolith collection device of a lunar rover according to the present disclosure.

FIG. 14 illustrates an example control process 1400 for controlling a voltage difference applied across a lunar regolith collection device of a lunar rover, to attract lunar regolith to the device based on a detected polarity of the lunar regolith. The process 1400 may be performed by any one of the controllers disclosed herein, such as the controller 112 of FIG. 1.

The control process 1400 may start when the controller is powered-on and/or at another suitable time. As shown in FIG. 14, control begins at 1402, where the controller controls a power supply (e.g., a voltage regulator of or associated with the power supply) to apply a neutral voltage (e.g., a ground voltage) to the collection device. For example, the power supply may be controlled to apply a neutral voltage to a connector (e.g., a terminal) of the collection device, a connector of a mesh plate of the collection device, etc. Control then proceeds to 1404, where the controller obtains a polarity of lunar regolith adjacent the lunar rover. The polarity of the lunar regolith may be obtained by, e.g., the polarity sensor 114 of FIG. 1.

At 1406, the controller determines whether the detected polarity of the lunar regolith (e.g., lunar dust) is positive. If so, the controller controls the power supply to apply a negative voltage to the collection device at 1408, to attract the lunar regolith (e.g., because the applied negative voltage is opposite to the detected positive voltage of the lunar regolith). If the controller determines at 1406 that the detected polarity of the lunar regolith is negative (e.g., not positive), the controller controls the power supply to apply a positive voltage to the collection device at 1410, to attract the lunar regolith. For example, the power supply may be controlled to apply a negative or positive voltage to another connector (e.g., another terminal) of the collection device, another connector of the mesh plate of the collection device, etc.

Control may then end as shown in FIG. 14 or return for further evaluation. For example, control may return to 1404 to again obtain a polarity of lunar regolith adjacent the lunar rover.

Figure 15:
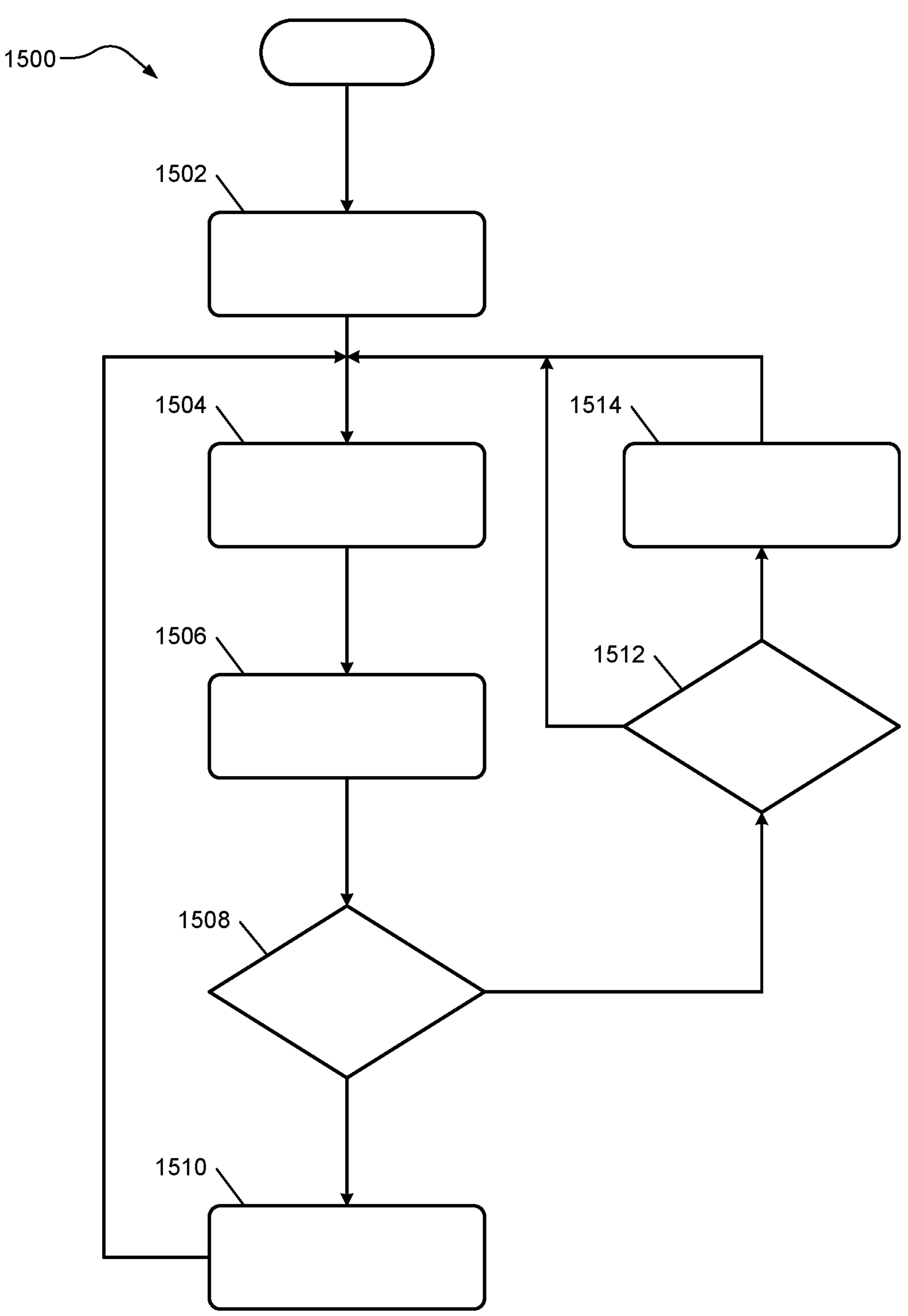
FIG. 15 is a flowchart of a control process for adjusting a voltage difference applied across a lunar regolith collection device of a lunar rover according to the present disclosure.

FIG. 15 illustrates an example control process 1500 for adjusting a voltage difference applied across a lunar regolith collection device of a lunar rover based on a determined density of lunar regolith. The process 1500 may be performed by any one of the controllers disclosed herein, such as the controller 112 of FIG. 1.

The control process 1500 may start when the controller is powered-on and/or at another suitable time. As shown in FIG. 15, control begins at 1502, where the controller controls a power supply (e.g., a voltage regulator of or associated with the power supply) to apply a voltage difference across the collection device, a mesh plate of the collection device, etc. Control then proceeds to 1504, where the controller receives a signal from a polarity sensor.

At 1506, the controller determines a density of lunar regolith based on the received signal. For example, the received signal from the polarity sensor may indicate a charge of the lunar regolith adjacent to the lunar rover. The controller may then estimate a density of the lunar regolith adjacent to the lunar rover based (in part) on the charge of the lunar regolith, a known amount of charge of a typical dust particle, and a known detection area (e.g., a volume) of the sensor. Control then proceeds to 1508.

At 1508, the controller determines whether the determined density is above a first threshold. If so, the controller controls the power supply to increase the voltage difference across the collection device, the mesh plate of the collection device, etc. at 1510. This may provide a stronger attraction of the lunar regolith to the collection device. If no at 1508, control proceeds to 1512.

At 1512, the controller determines whether the determined density is below a second threshold. In such examples, the second threshold may be lower than the first threshold of 1508. If not, control returns to 1504. If so, control proceeds to 1514 where the controller controls the power supply to decrease the voltage difference across the collection device, the mesh plate of the collection device, etc. In doing so, energy of the power supply (e.g., a battery) may be conserved. Control then returns to 1504.

Figure 16:
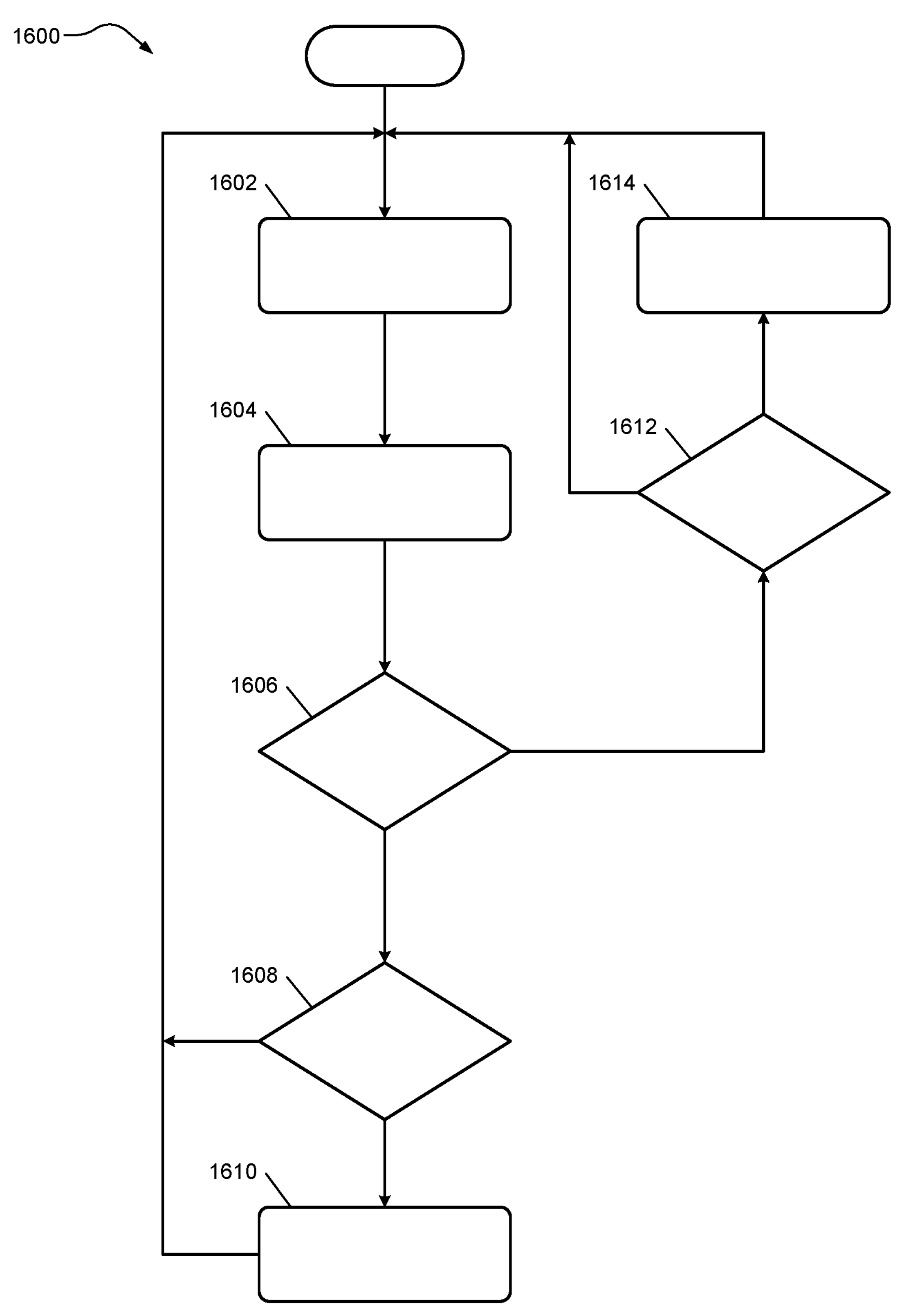
FIG. 16 is a flowchart of a control process for controlling a movable arm of lunar rover according to the present disclosure.

FIG. 16 illustrates an example control process 1600 for controlling a movable arm of lunar rover. The process 1600 may be performed by any one of the controllers disclosed herein, such as the controller 1012 of FIG. 10.

The control process 1600 may start when the controller is powered-on and/or at another suitable time. As shown in FIG. 16, control begins at 1602, where the controller receives a signal from a polarity sensor. Control then proceeds to 1604, where the controller determines a density of lunar regolith based on the received signal as explained herein.

At 1606, the controller determines whether the determined density is above a threshold. If so, control proceeds to 1608. Otherwise, control proceeds to 1612.

At 1608, the controller determines whether the movable arm is in a low position. If so, control returns to 1602. Otherwise, control proceeds to 1610 where the controller lowers the movable arm to its low position. For example, the controller may control an actuator, a motor, etc. to lower the movable arm as desired. Control then returns to 1602.

At 1612, the controller determines whether the movable arm is in its low position. If not, control returns to 1602. If yes, control proceeds to 1614 where the controller lifts (e.g., raises, etc.) the movable arm to its high position. For example, the controller may control the actuator, the motor, etc. to raise the movable arm as desired. Control then returns to 1602.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A lunar rover comprising:

a body;

at least one collection device adjacent to the body and configured to collect lunar regolith, the at least one collection device including at least one wall defining an opening and at least one plate positioned in the opening;

at least one polarity sensor configured to detect a polarity of lunar regolith adjacent to the lunar rover; and a power supply electrically connected to the at least one plate of the collection device and configured to apply a voltage difference across the at least one plate, thereby attracting lunar regolith into the at least one collection device.

2. The lunar rover of claim 1, wherein the at least one collection device has a funnel shape with the opening tapering from a first end to a second end opposing the first end.

3. The lunar rover of claim 2, wherein the at least one plate includes a steel wool mesh.

4. The lunar rover of claim 2, wherein:

the at least one plate includes a first mesh plate having perforations and a second mesh plate having perforations;

the first mesh plate and the second mesh plate are spaced apart from each other; and the perforations of the second mesh plate are smaller than the perforations of the first mesh plate.

5. The lunar rover of claim 4, wherein:

the first mesh plate is adjacent to the first end of the opening in the collection device; and the second mesh plate is adjacent to the second end of the opening in the collection device.

6. The lunar rover of claim 5, wherein:

the power supply is configured to apply a first voltage difference across the first mesh plate and a second voltage difference across the second mesh plate; and the second voltage difference is larger than the first voltage difference.

7. The lunar rover of claim 2, wherein the at least one plate has a conical shape.

8. The lunar rover of claim 7, wherein:

the at least one collection device includes a conduit extending through the at least one conical-shaped plate; and the conduit is configured to transport lunar regolith downward from the at least one conical-shaped plate to a bottom portion of the at least one collection device.

9. The lunar rover of claim 1, further comprising a controller in communication with the at least one polarity sensor, the controller configured to control the power supply to adjust a polarity of the voltage difference applied across the at least one plate of the collection device based on the detected polarity of the lunar regolith adjacent to the lunar rover.

10. The lunar rover of claim 1, further comprising a controller in communication with the at least one polarity sensor, the controller configured to:

receive a signal from the at least one polarity sensor indicative of a charge of the lunar regolith adjacent to the lunar rover;

determine a density of the lunar regolith adjacent the lunar rover based on the received signal; and control the power supply to adjust the voltage difference applied across the at least one plate of the collection device based on the determined density of the lunar regolith adjacent the lunar rover.

11. A lunar rover comprising:

a body;

at least one collection device configured to collect lunar regolith;

a movable arm including a first end connected to the body and a second opposing end connected to the at least one collection device;

at least one polarity sensor configured to detect a polarity of lunar regolith adjacent to the lunar rover;

a power supply electrically connected to the at least one collection device; and a controller in communication with the at least one polarity sensor and the power supply, the controller configured to control the power supply to apply a voltage difference across the at least one collection device based on the detected polarity of the lunar regolith adjacent to the lunar rover, thereby attracting lunar regolith to the at least one collection device.

12. The lunar rover of claim 11, wherein:

the controller is in communication with the movable arm; and the controller is configured to receive a signal from the at least one polarity sensor, and in response to receiving the signal, adjust the movable arm from a first position to a second position.

13. The lunar rover of claim 12, wherein:

the at least one collection device includes at least one wall defining an opening and at least one mesh plate positioned in the opening; and the controller is configured to control the power supply to apply the voltage difference across the at least one mesh plate, thereby attracting lunar regolith into the at least one collection device.

14. The lunar rover of claim 13, wherein the at least one mesh plate includes a steel wool mesh.

15. The lunar rover of claim 13, wherein:

the at least one mesh plate includes a first mesh plate having perforations and a second mesh plate having perforations;

the perforations of the second mesh plate are smaller than the perforations of the first mesh plate;

the controller is configured to control the power supply to apply a first voltage difference across the first mesh plate and a second voltage difference across the second mesh plate; and the second voltage difference is larger than the first voltage difference.

16. The lunar rover of claim 12, wherein the at least one collection device includes at least one wall defining an opening and at least one conical-shaped plate positioned in the opening.

17. The lunar rover of claim 16, wherein:

the at least one collection device includes a conduit extending through the at least one conical-shaped plate; and the conduit is configured to transport lunar regolith downward from the at least one conical-shaped plate to a bottom portion of the at least one collection device.

18. The lunar rover of claim 12, wherein the at least one collection device includes a mesh plate at least partially surrounding a perimeter of the body.

19. A lunar rover comprising:

a body;

at least one collection device adjacent to the body and configured to collect lunar regolith, the at least one collection device including at least one wall defining an opening and at least one plate positioned in the opening, the at least one collection device having a funnel shape with the opening tapering from a first end to a second end opposing the first end, the at least one plate including a steel wool mesh; and a power supply electrically connected to the at least one plate of the collection device and configured to apply a voltage difference across the at least one plate, thereby attracting lunar regolith into the at least one collection device.

20. The lunar rover of claim 19, further comprising:

at least one polarity sensor configured to detect a polarity of lunar regolith adjacent to the lunar rover; and a controller in communication with the at least one polarity sensor, the controller configured to control the power supply to adjust a polarity of the voltage difference applied across the at least one plate of the collection device based on the detected polarity of the lunar regolith adjacent to the lunar rover.

* * * * *